United States Patent [19]
Sugden

[11] Patent Number: 5,406,176

[45] Date of Patent: Apr. 11, 1995

[54] COMPUTER CONTROLLED STAGE LIGHTING SYSTEM

[75] Inventor: Walter H. Sugden, Stratford, Canada

[73] Assignee: Aurora Robotics Limited, Ontario, Canada

[21] Appl. No.: 180,298

[22] Filed: Jan. 12, 1994

[51] Int. Cl.⁶ ............................................. G05F 1/00
[52] U.S. Cl. ................................... 315/292; 315/293; 315/294; 315/312; 315/360; 362/239; 362/233; 362/85
[58] Field of Search ............... 315/292, 293, 294, 312, 315/360, 291; 362/239, 233, 85

[56] References Cited

U.S. PATENT DOCUMENTS

| | | | |
|---|---|---|---|
| 4,392,187 | 7/1983 | Bornhorst | 362/233 |
| 4,398,131 | 8/1983 | Tarroux et al. | 315/292 |
| 4,437,169 | 3/1984 | Bortershaw et al. | 364/900 |
| 4,924,151 | 5/1990 | D'Aleo et al. | 315/295 |
| 4,980,806 | 12/1990 | Taylor et al. | 362/85 |

Primary Examiner—Robert J. Pascal
Assistant Examiner—Reginald A. Ratliff
Attorney, Agent, or Firm—Cushman, Darby & Cushman

[57] ABSTRACT

A stage or theatre lighting system having a plurality of multiple parameter lamp units each comprising means for producing a light beam having a plurality of adjustable parameters relating to beam characteristics and beam position; drive means for controlling a plurality of said parameters; lamp processor means for controlling said drive means; and lamp memory means for storing data and programs for execution by said lamp processor means; the improvement comprising said lamp memory means having non-volatile memory means for storage of all of said operating program and volatile memory means for storage of all lamp cue data; internal clock means; and command means to operably command said operating program to execute said stored cue data in a desired, pre-programmed time and sequence using said internal clock means. The system can work with a personal computer and does not need a remote control.

6 Claims, 4 Drawing Sheets

COMPUTER CONTROLLED STAGE LIGHTING SYSTEM

FIELD OF THE INVENTION

The present invention relates to stage and theatre architectural lighting systems and, in particular, to said system using computerized robotic lighting fixtures.

BACKGROUND OF THE INVENTION

Theatre lighting currently consists of a plurality of light fixtures that are manually set for all their parameters, such as aim (pan & tilt), beam colour, beam size, gobo pattern and shuttering (shaping) of the beam, focus of the edge of the projected light pool or gobo (hard to soft) and then left that way for the current performance (show). These parameters are set to a very high degree of accuracy to satisfy the designer's requirements. To achieve a new parameter, these light fixtures have to be manually changed or else another fixture installed with the appropriate parameters manually set and that fixture turned on as needed. The intensity of the light beam of the lights is controlled by a centralized computer dimmer console. To achieve lighting cues (looks) a designer/technician uses the combination of light fixtures set to their parameters, the intensity control of the dimmer console and the console's crossfading control between dimmers to achieve cues. The limits of this system are that much time, equipment and manual labour is involved to set the lights for each production and again to change the lights for another production. Also, there are physical space limits to the number of manual light fixtures that can be located at any position about the stage.

The history of lighting in theatre, dance and opera has concerned itself primarily with using these manual lighting fixtures. During a performance, these manual light fixtures do not dynamically move except for changes in the intensity of the light beams being projected. In U.S. Pat. No. 4,392,187 by Bornhorst, the lighting system described has a large number of remotely controlled light fixtures and a central processor in a central control console which generates commands that are sent directly to the lights for controlling each of the lighting parameters of the light fixtures. This system is essentially a real time control of moving light beams with computer assistance to help the operator to execute elaborate moving affects. Each of the light fixtures is controlled for pan, tilt, acceleration, intensity, colour and beam shape. Digital commands for each of the fixture parameters are transmitted from the central processor, which is in a console, through a relatively high speed data link to each of the light fixtures. The fixtures respond to data transmitted by the operation of control knobs or faders on the console with talk-back from the fixtures to report to the central processor when each of its parameters is positioned. This system is designed to facilitate dynamic light fixture movement, as used in the music concert industry and requires very powerful and fast CPUs in a dedicated control console and a very high speed data link to communicate back and forth to each light unit. If an interruption or noise happens in the communication the light units fail or operate with errors.

Another system is described in U.S. Pat. No. 4,980,806 to Taylor, et al., which describes a moving light system like the Bornhorst system except that the processing is distributed to a lamp processor in each multiple parameter light fixture. There is feedback from sensors for each parameter to read the parameter's location and record it into the lamp's memory. An upload command transfers all the recorded cue data from all the individual lamp memories to the disk storage on the central control console. The control console allows for manual control of the lamps as well as execution of cues stored in each lamp by means of a broadcast cue from the console. This system again is designed to facilitate dynamic light fixture movement and requires two-way communication between a dedicated console and the light unit to a) allow manual control of the light unit, and b) to record the parameter cue data to a safe storage medium in the console. It also requires precise position encoder sensors for each parameter to instruct its lamp processor what its value is to enable control from the centralized console and to record the parameter values for later recall. This creates further potential for failure and error should there be a fault. Also, this system does not allow for setting the light unit's parameters except by manual manipulation of the central consols faders or control knobs.

All multi-parameter light fixtures currently developed are designed to meet the needs of a dynamic moving light effect and not the automation of the basic manual light fixture which is almost exclusively used to meet the needs in theatre, opera and ballet. Therefore, there exists a need for a new configuration and method of operation of an automated stage lighting system which tries to truly automate the manual stage luminaire, the ellipsoidal spotlight.

SUMMARY OF THE INVENTION

It is an object of the present invention to provide an improved stage lighting system and a method of control thereof, having the advantages as hereinafter described.

Accordingly, in its broadest aspect the invention provides a stage or theatre lighting system having a plurality of multiple parameter lamp units each comprising means for producing a light beam having a plurality of adjustable parameters relating to beam characteristics and beam position; drive means for controlling a plurality of said parameters; lamp processor means for controlling said drive means; and lamp memory means for storing data and programs for execution by said lamp processor means; the improvement comprising said lamp memory means having non-volatile memory means for storage of all of said operating program and volatile memory means for storage of all lamp cue data; internal clock means and command means to operably command said operating program to execute said stored cue data in a desired, pre-programmed time and sequence using said internal clock means.

Preferably the command means comprises a central processor means in communication by a data link system with each of said lamp units to commence the execution. More preferably, the central processor means is a desk top PC.

The central processor means preferably comprises means for receiving parameter-controlling inputs for directing the operation of the lighting system to comprise the lamp cue data, and means for downloading the data to the volatile memory means of each respective lamp unit. The data link system most preferably comprises a common path for connecting the central processor means to each of the lamp units.

In a further aspect the invention provides a method of controlling a stage or theatre lighting system having a plurality of multiple parameter lamp units each having an associated processor having non-volatile memory means, volatile memory means, and internal clock means, the method comprising the steps of
  (a) storing executable operating programs in each of said non-volatile memory means of said lamp units;
  (b) storing all appropriate lamp cue data in each of said volatile memory means of said lamps; and
  (c) initiating each of said lamp units to command said operating program to execute said stored cue data in pre-programmed time and sequence using the internal clock means.

The lighting system of the present invention allows the light parameters to be set remotely for each cue required. A data file recording all the cue parameters of each individual lamp unit for all the cues required of a production are stored in that lamp unit's internal memory. A programmed microprocessor in each lamp unit reads the data file and controls the setting of the lamp's parameters. The benefit of such an automated lighting system is the increased capacity for designers to create more lighting looks for a show with fewer light fixtures and the ability to change the lights over to another show's requirements, such as in a repertory theatre, opera or dance situation. These changes can happen in minutes instead of the many hours or days by the manual way.

Generally, the system of the present invention comprises a plurality of automated lamp units in which each unit has an associated lamp processor having EPROM and RAM memory for programming therein, with battery back-up to contain show data files. Preferably, the system has a main CPU, such as a desktop personal computer running proprietary user interface software to create show data files, save backups of the data files, modify the show data files, download show data files to the automated lamp unit's RAM memory and allow the operator to control the execution of the cues and the timing of those cues to all the automated lamp fixtures. The link between the personal computer and the automated lamp unit is, for example, via a RS232, RS422, or RS485 communication card from the desktop computer by three wire cable or Ethernet or fibre optics or radio frequency broadcast or infra-red broadcast to all the automated lamp units in the system. Each of the lamp units use clocking means independent of a data link or control consol.

The main advantages the system according to the invention are (i) each lamp fixture has the capability to achieve the functionality of a theatre ellipsoidal spotlight, viz, the aim, focus, colour, beam shaping, beam and gobo size, gobo orientation; (ii) the lack of a dedicated console, which means a backup system is readily available with a second PC computer; (iii) the operator or designer can input parameter data or make changes on his own computer away from the theatre and download the data file later; (iv) the colouring system possible with the system of the invention allows for faster setting and consistency of colour among all the lamps in the system; (v) the user interface is consistent with the industry norms for computer dimer control consols thereby eliminating the need for a specially trained operator; (vi) by having the control software based, input for data files can come from other computer software such as computer aided drafting or computer modelling programs to produce a show data file which can be downloaded to the lamp units; (vii) as the lamp parameters are stepped controlled, the accuracy and consistency of the settings among many lamps are greatly enhanced; (viii) the values for the pan and tilt of the lamp are in degrees of an arc so the comprehension of where the lamp is aimed from a standard reference is readily understood; (ix) the system easily allows for upgrading in the user interface and customization because of the ability to change the software; (x) the non volatile preprogrammed information in each lamp unit EPROM allows for consistency and reliability of operation between all lamps in a lighting system; (xi) the system is not susceptible to noise or failure in the data link during a show because all parameter data is contained in each lamp processor RAM memory to be processed by its own preprogrammed lamp processor; and (xii) the overall system is less costly and easier to operate and repair.

These and other objects and advantages of the lighting system according to the present invention will become apparent from a reading of the specification as a whole.

BRIEF DESCRIPTION OF THE DRAWINGS

In order that the invention may be better understood, a preferred embodiment is now described by way of example only with reference to the accompanying drawings, wherein.

DETAILED DESCRIPTION OF A PREFERRED EMBODIMENT

Generally, the invention preferably comprises an automated lamp unit or units which have an electronic dimmer; very precise control of lamp pan and tilt means; precision zoom optic system means to control the size of the projected beam and the precise focus of the projected beam; three colour wheels; first wheel of cyan filters, second wheel of magenta filters, third wheel of amber filters (this producing secondary colour mixing), each colour wheel having one or more precisely coated dichroic filters with progressive colour steps of increasing hue to provide precise colour control and a predefined colour palette that is consistent between all lamps, and a gobo wheel which can hold one or more "D" sized (50 mm) gobos and wherein each of these gobos can be precisely rotated clockwise or counterclockwise to give either precise orientation of the gobo within the light path or a continuous rotation effect.

Figure 1:
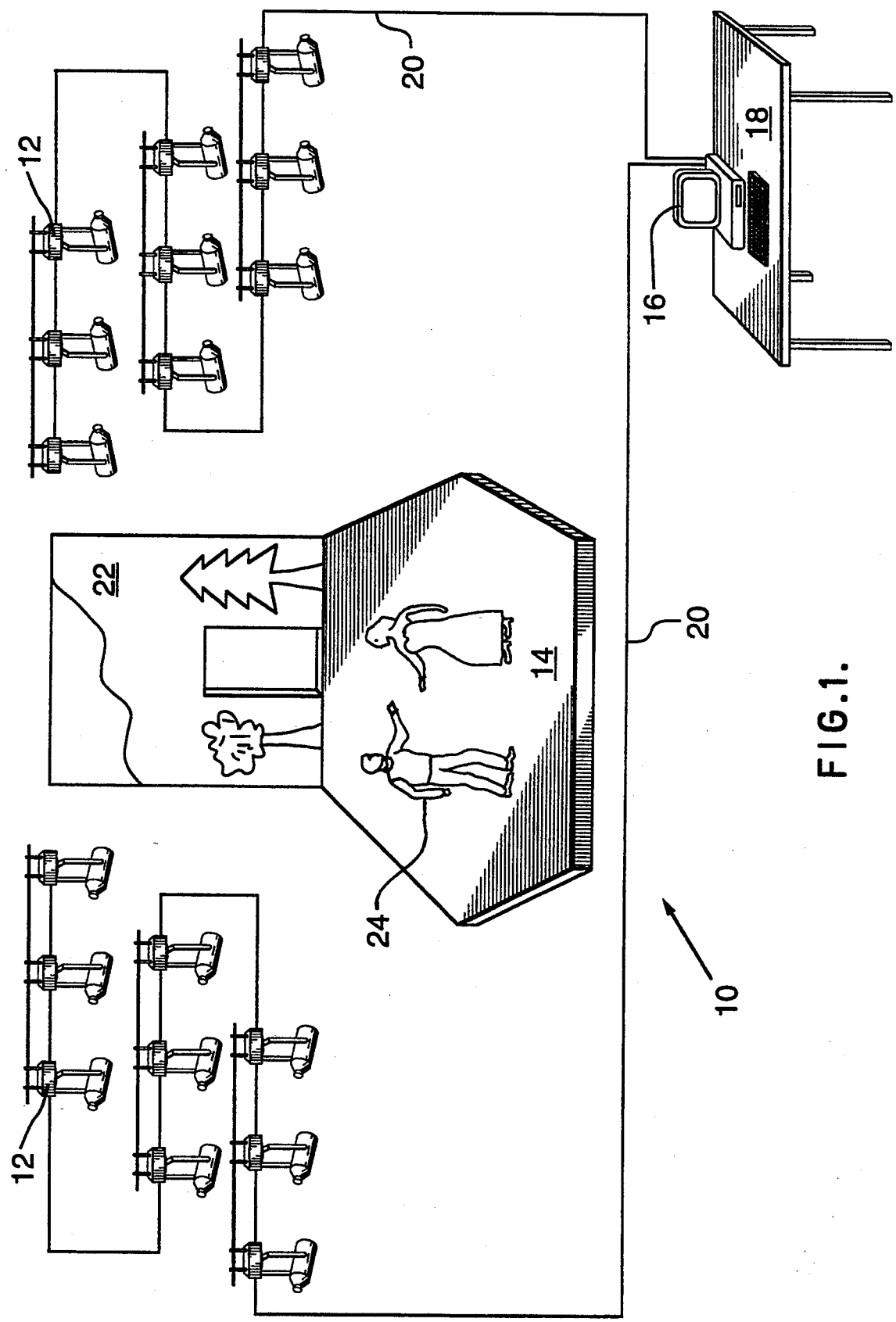
FIG. 1 is a perspective view of a computer controlled lighting system according to the invention showing the principal components thereof in association with a stage.

With reference now to FIG. 1, this shows generally as 10, a computer controlled stage lighting system having a plurality of automated lamp units 12, suspended over a stage 14 and in data communication with a desktop computer 16 on a table 18 through data link 20.

System 10 is shown as it would illuminate stage 14, scenery 22 or performers 24. The operation of system 10 during a performance is automated or under the control of a switch or the 'cue go' button of a computer lighting dimmer control unit (not shown) or the designated 'cue go' button of desktop computer 16. The desired lighting effect produced is determined by cue data stored in each of automated lamp units 12. Desktop computer 16, for example, a PC clone or Apple Macintosh, provides the user interface to remotely set the parameters of each automated lamp unit 12 for each lighting cue required of the performance. Desktop computer 16 allows the downloading of show data files to each automated lamp unit 12, the long term storage of multiple show data files, the editing of those show data files, the hard copy printout of lamp units' 12 parameter data for each cue in a show and the file sharing over a data modem to other remote computers (not shown). All such activity on desktop computer 16 is by proprietary user interface software running on desktop computer 12's operating system.

Automated lamp units 12 are connected to each other by data link 20 which is daisy chained between them and desktop computer 16 (or a computer dimmer control console not shown) using a serial interface communication standard, such as, RS232, RS244 or RS485 or MIDI standard communication interface or Ethernet standard communication interface. Each automated lamp unit 12 has a unique protocol address so that each individual automated lamp unit 12 responds to only the downloading of data which is addressed specifically to it. The data link can also be linked to addressable electronic dimmers with memory to control other lights or equipment (not shown).

In operation, system 10 can instruct automated lamp units 12 to adjust their parameters to a specified internally stored cue and the addressable electronic dimmers to a specific internally stored cue to adjust for intensity of a fixed lighting instrument or the on/off operation of other equipment. Each of automated lamp units 12 and memory dimmer in the system can have an individual response required for each and every cue in a show. As each lamp unit stores only the data it needs to operate its parameters for all the cues in a performance, it follows that the automated lamp unit can function using low power CPU's and small memory storage chips. The result is lower hardware cost. More reliable operating is also achieved as the whole system is mechanically simpler, as no feedback is required back to a central console nor is a special dedicated console required to run system 10 for a performance.

One main advantage of this system over others is that a desktop computer is used to input data into the system. This facilitates technicians or lighting designers to work in their offices away from the theatre to design their lights without having to get access to the performance stage space, which is often very limited and costly. Also, data can be generated from other computer aided design or modelling software as a lighting designer works on his desktop computer. As can be seen when a show has hundreds of cues involving hundreds of lighting fixtures, the time required to just input all the parameter data can be substantial so that the use of a desktop computer saves significant time when a show is designed.

Figure 2:
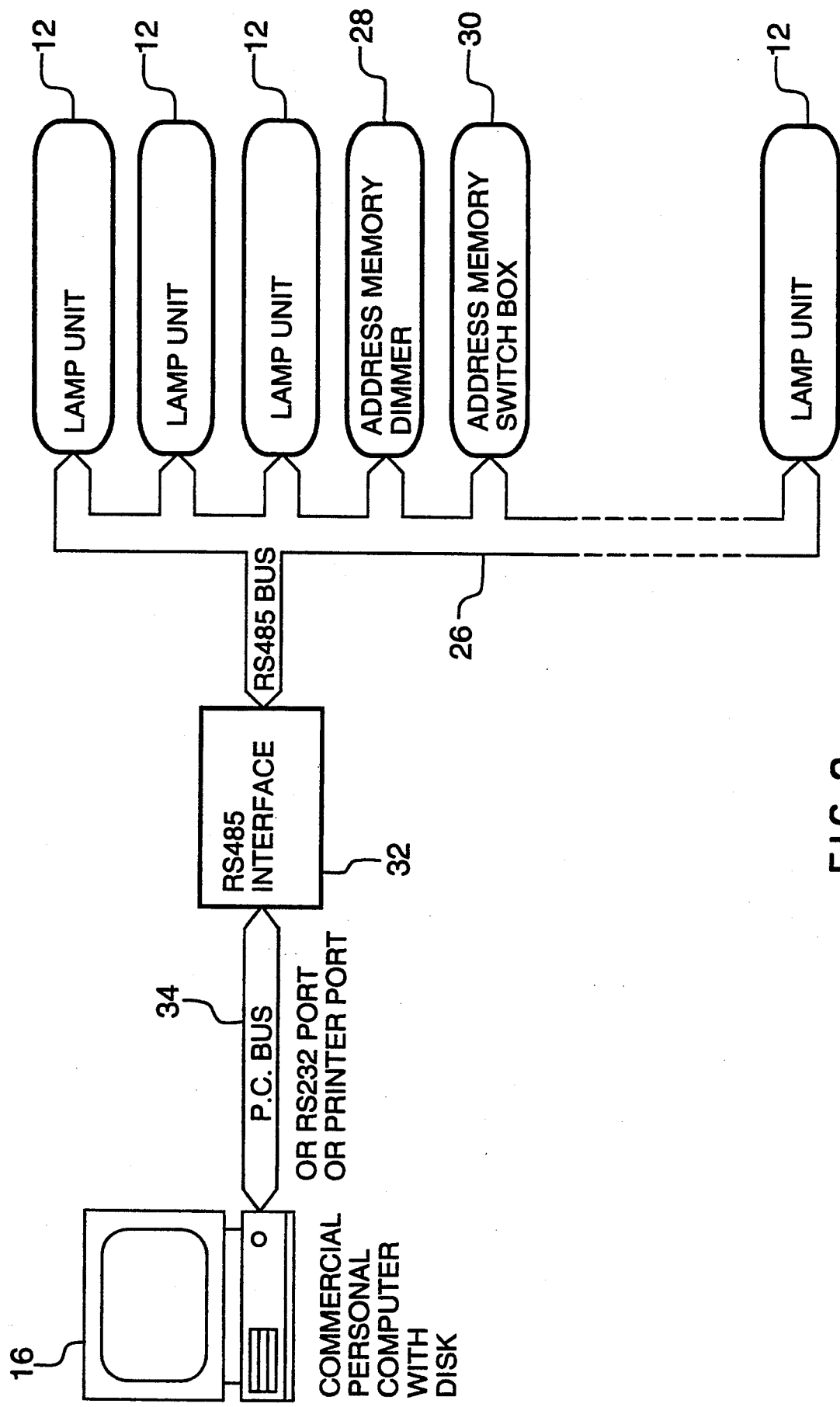
FIG. 2 is a diagrammatic block diagram of the lighting system according to the invention, which illustrates the communication between a personal computer and the various lamp units.

The functional block diagram of system 10 is shown in FIG. 2 as it relates to operation of a plurality of stage equipment. Desktop computer 16 is connected via a data link 26 for the downloading of data files to a plurality of stage equipment. The data link is via serial RS485, in the embodiment shown but alternative links may be used, for example with RS232 or RS422, MIDI (musical instrument digital interface) or Ethernet communications, using the appropriate cabling or radio frequency or infra-red transmission from desktop computer to a receiver (not shown).

System data link 26 connects desktop computer 16 to each automated lamp units 12 and/or addressable memory dimmers 28 to control the intensity of fixed lighting equipment and/or addressable memory capable switch boxes 30 which can control other equipment as in motor hoists, motorized stage wagons, or smoke effects machines, and the like (not shown).

Desktop computer 16 serves as a user interface to system 10. There is no direct manual control over automated lamp units 12. A setting or change of any parameter is keyed in appropriately on computer 16 and then a download of a new data file is transmitted. The intended automated lamp unit 12 reads the address of the data and accepts the downloaded data into its RAM memory, its processor reads the data file and effects adjustments of its lamp parameters, according to the proprietary operating program read from the lamp unit's EPROM memory 304.

Communication with automated lamp units 12 is carried out by a serial RS485 communications interface 32 plugged into PC Bus 34 of desktop computer 16 or, in an alternative embodiment, by a RS485 communications interface (not shown) connected to the serial port or printer port of the desktop computer 16.

Figure 3A:
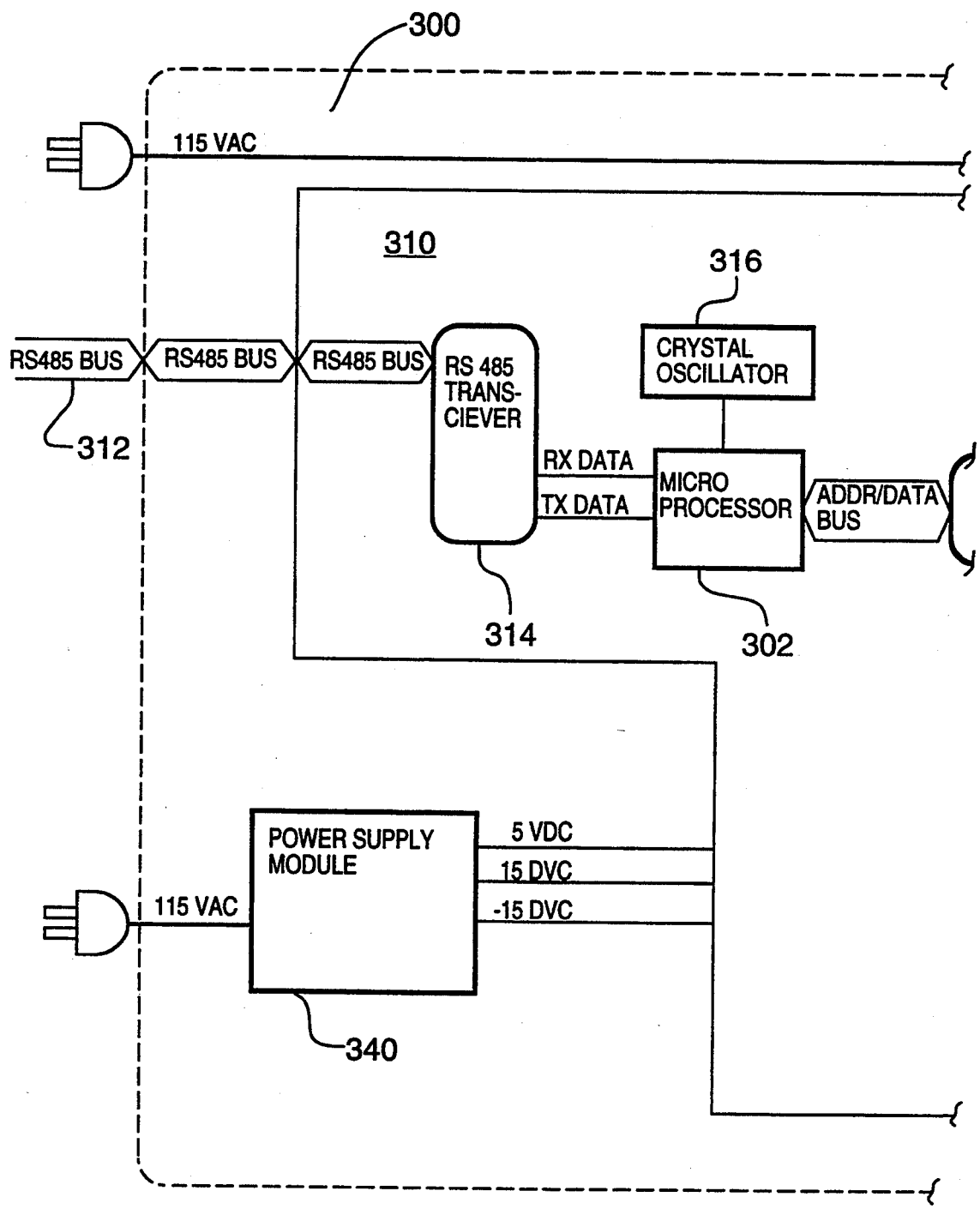
FIGS. 3A and 3B comprise, in two parts a block diagram for the electronic circuitry in an automated lamp unit and associated components of use in a system according to the invention.
Figure 3B:
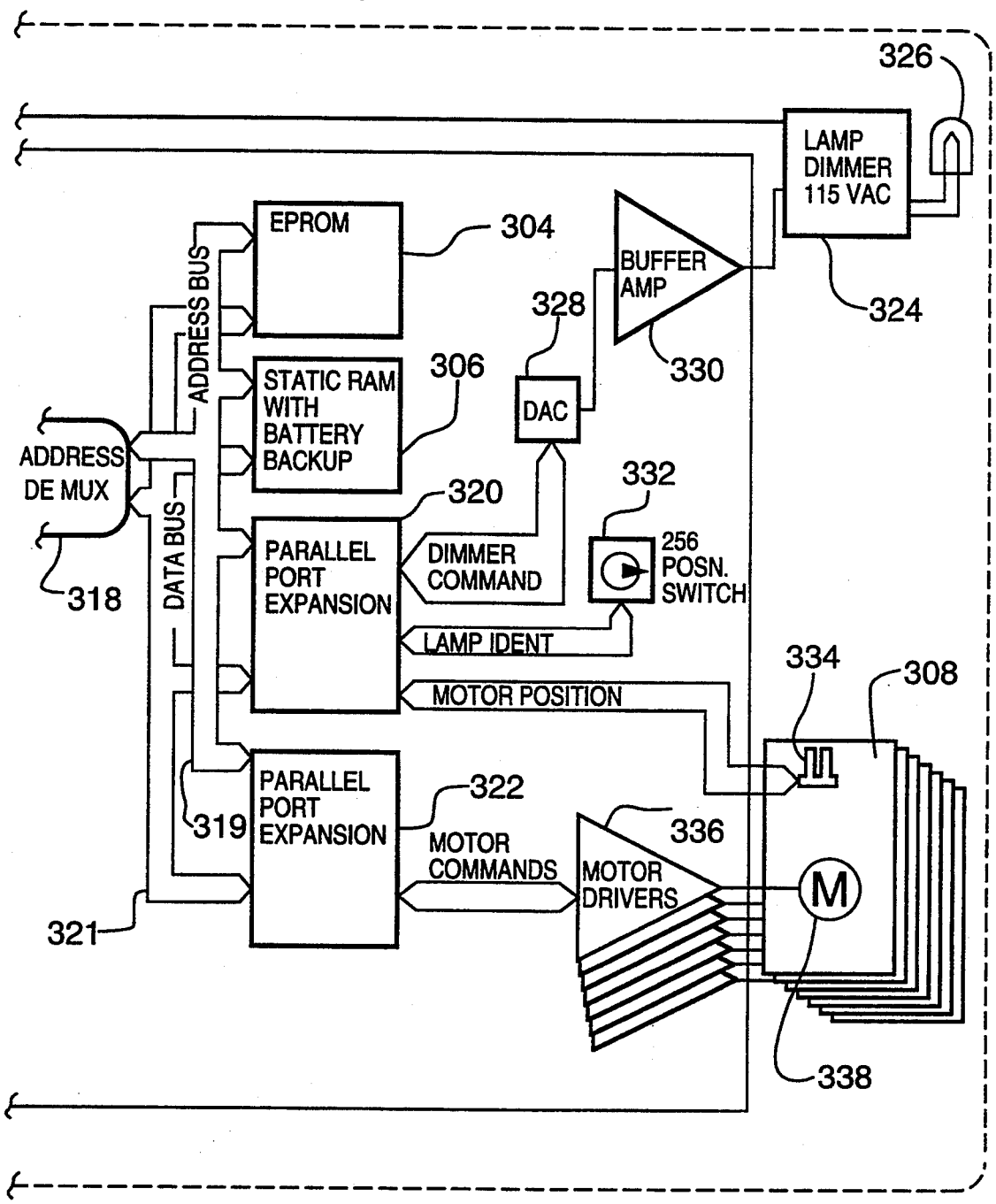

With reference now to FIGS. 3A and 3B, these show two halves of a block diagram illustrating the electronics in an automated lamp unit enclosure 300 (dotted line), Intel Model 8031 lamp microprocessor 302, memories 304, 306 and associated components. These figures show the block diagram of the circuitry that drives the parameter adjustments or lamp actuators 308 in automated lamp unit 12.

With reference to FIGS. 3A and 3B in more detail, there is shown automated lamp unit 12 controller board 310. The communications link from personal computer 16 to lamp unit 12 is via a three-wire cable using RS485 ($\frac{1}{2}$ duplex serial protocol) 312 connected to the RS485 receiver/transmitter 314. This receiver/transmitter is connected to microprocessor 302 via a transmit data and a receive data lines. A crystal oscillator 316 is connected to microprocessor 302 to provide a clock base for the functioning of microprocessor 302 which computes using non-volatile proprietary code in EPROM 304 and acts on the data files stored in RAM 306 to direct the functions of the parameters of automated lamp unit 12 and to control their timing.

Microprocessor 302's multiplex signal is connected to an address demultiplexer unit 318, via an address/data bus. Demultiplexer 318 separates the multiplex signal from microprocessor 302 to a separate address bus 319 and data bus 321. EPROM 304 contains the proprietary program code which microprocessor 302 uses to control the function of the various parameters to the required states. The cue data to determine what are those states is stored in RAM 306 with battery backup to preserve the memory in case of a power outage. The cue data is generated by proprietary user interface software of desktop computer 16 and stored in the automated lamp unit's RAM 306 when a download is executed from desktop PC 16.

The data bus and address bus connect microprocessor 16 to Parallel Port Expansion circuits 320 and 322. PPE 320 functions to provide registers to control lamp dimmer 324 and, thus, the intensity of 1000 w. lamp 326. The control is facilitated by a DAC 328 which converts the digital register information at PPE 320 to an analog voltage signal which passes through a buffer amplifier 330 to lamp dimmer 324. PPE 320 also holds the lamp identity register determined by the position of a 256 position switch 332, and the registers for the motor zero index position control. The control is provided by an opto-interrupter 334, one for each variable parameter of the automated lamp unit. It is connected to opto-interrupter 334 in each lamp unit actuator 308 circuit.

Parallel Port Expansion circuit 322 provides the registers for the motor commands from microprocessor 302 and sends the commands through amplifiers 336 to stepper motors 338 of lamp unit actuator 308 circuit.

The RS485 trans-ceiver circuit 314 operates in conjunction with RS485 interface 32 of desktop PC 16 to allow communication of cue data files between the user interface software on desktop computer 16 and automated lamp unit controller board 310. The RS485 protocol allows for transmission of the serial data over long distances without the need for repeater boxes to automated lamp units 12 and allows this communication line to be daisy chained through each lamp unit. This greatly reduces the amount of communication cable required. Its multi-drop standard means that the link is not broken if one of the lamp units in the chain has a failure at its data port.

The power supply 340 in each automated lamp unit 12 supplies the correct voltage to operate the automated lamp unit's controller board circuit 310 as well as the DC power for stepper motors 338 in the actuators circuits 308.

Automated lamp unit controller board circuit 310 serves to initialize automated lamp unit 12, control the function of parameter control actuator circuits 308 in response to the data file stored in its static RAM memory 306, store cue data downloaded from the desktop computer 16 and respond to cue go commands received from computer 16 or a switch or other lighting control board (not shown) to recall the cues from its memory 306 to command the lamp unit's actuators 308 to their desired status.

Parameter actuator circuit 308 is contained within automated lamp unit 12 and contains stepper motor 338 and opto-interrupter 334. Stepper motor 338 is used to actuate all the variable parameters of the automated lamp unit except the electronic dimmer 324, for example, pan or tilt. Lamp units controller circuit 310, via command lines from motor drivers amplifiers 336, actuate stepper motors 338 for direction and the count of steps to move. Opto-interrupter 334 serves to send a transition via a data motor position data line to the register in the PPE 320 of lamp controller board circuit 310. Upon powering or turning on automated lamp unit 12, opto-interrupter 334 senses whether it is in a dark or light state and puts the register on PPE 320. Microprocessor 302 decides whether to drive stepper motor 338 and, if so, in which direction to achieve the desired transition from opto-interrupter 334. When the desired transition is achieved, micro-processor 302 commands stepper motor 338 to move to a calibrated position. This calibration can be set by the operator through the user interface software on the PC and downloaded to the automated lamp unit's memory 306, where microprocessor 302 reads the calibration and sets actuator circuits 308 accordingly on powering up automated lamp unit 12. This gives the operator the choice of having the lamp unit initialize to his/her required settings, for example—the colour at white (open position of all three colour wheels), pan at 0°, tilt at 20°, gobo position #1, gobo orientation at 0°, zoom at 20° beam size of the light pool, focus set for a sharp edge to the light beam.

In accordance with a primary feature of the invention, the processing operation of each automated lamp unit 12 is handled by its own internal microprocessor 302 to the cue data file stored in its RAM memory 306. Therefore, automated lamp unit 12 does not require a central control console with faders and dials to set cue data in lamp units 12, nor do automated lamp units 12 have to upload their cue data to a central console to (a) provide long term storage or (b) tell the central console where are its parameters. This substantially reduces the requirements of the data link from those used in prior art systems, to thereby reduce errors by lowering of the communication speed of the data link. Each lamp unit has consistent parameter behaviour because all the lamp units' processors use the same proprietary program in their EPROM 304. The system of the present invention does not require on initialization the download of its programming from a central console which, thus, greatly enhances reliability of the system and greatly reduces costs.

The present system is also to be distinguished from prior art systems wherein a central console reads its controls inputs and upon sensing a change processes that change, such as providing the ordinal number of a switch or the identifier of a fader, and transmits this change signal to all lamp units simultaneously. Each lamp recognizes the intended effect of this change and calculates the desired response. In the present system, according to the invention, there is no central console, console hardware or central processing requirements, high speed data transmission is eliminated, which greatly enhances reliability of the present system of the invention over prior art systems. Further, a special central console does not need to be housed in the lighting operators booth, nor does an extra operator need to be employed. Should a new desktop computer be required it is easy to obtain and relatively inexpensive to have a backup system on hand. All cue data for a show or production is backed up and saved as a show file on for example a desktop computer's hard disk, floppies or other such computer storage media. This eliminates the need for lamp unit 12 to communicate back to a console to upload its data for safe storage.

As an operator uses the proprietary user-interface software he/she creates a show file. When the operator requires, this file is downloaded to all automated lamp units 12 in the system via the RS485, protocol (half duplex-serial) on data link 34. Each automated lamp unit 12 recognizes by its identification index on the data stream, determined by its 256 position switch 332, only the data from the show file pertaining to itself, which it then downloads in its RAM 306 memory. Once downloaded, the automated lamp unit adjusts its parameters to the cue data state. The operator can start a cue, make a cue pause or command lamp units 12 to go to another cue from the user interface. If the operator desires to change a parameter on one or a plurality of lamp units 12 he/she must input the change to the show file and download the changed file to lamp units 12. There is no direct manual control over the lamp units' parameters. This feature of the present invention greatly simplifies the hardware and processing circuitry over prior art systems, thus improving reliability. Another benefit of the present invention is that data for show files can be obtained from other lighting design software such as CAD program files or 3-D modelling program files. This allows designer/operators who use these software programs to save considerable time by not having to enter data twice and, thus, greatly increase their productivity. Another enhancement of the present invention is that the proprietary user-interface software can be improved or customized to a particular operator or theatre's needs without the need to replace a central control console.

The detailed initialization of automated lamp unit 12 is as follows.

When electrical power is turned on for automated lamp unit 12, processor controller board 310 is initialized whereby its microprocessor 302 reads its proprietary program stored in its EPROM 304. Thereby microprocessor 302 is ready to operate the variable parameters within the lamp unit based on cue data stored in its RAM memory 306. Also, on powering up of automated lamp unit 12, actuators 308 within unit 12 begin to change based on the status of opto interrupter 334 for each respective actuator 308. When opto-interrupter 334 is in the initialization program's desired status stepper motors 338 do not move. When opto-interrupter 334 is not in the desired initialization status of the program, stepper motor 338 drives the variable parameter in the appropriate direction until it triggers opto-interrupter 334 to put the appropriate register on PPE 320. Microprocessor 302's initialization program ends when all opto-interrupters 334 are in the correct initialization status, whereby all actuators 334 are said to be at their initialization point. Based on the actuator calibration index stored in the cue data file, all actuators 308 will move to the desired calibration state. This is a value set by the operator or designer of a show/production or theatre in the cue data file. Once in this state all lamp units 12 are ready to respond to any start switch such as its internal clock, a manual or automated external switch, a 'cue go' command from desktop PC 16 or a 'cue go' from a computer dimmer lighting console. Therefore, once an automated lamp unit 12 is initialized, it responds to 'cue go' commands (external or internal), whereby each lamp unit 12 response is based on the parameter data stored in its RAM 306 memory for the 'cue go' requested. In a performance situation this greatly enhances the reliability of the system because the data link only has to transmit the 'cue go' message. Also, the data link is not needed in an automated sequence, so if the data link is broken the system still continues to function, which further enhances reliability. All the cue data and processing of the data occurs within each lamp unit 12 without the need of high speed external data link communications to a central processing console. Another improvement is if one lamp unit 12 in the system fails, it does not impede the rest of lighting system 10's operation. In such a failure the cue data of a failed lamp unit could be downloaded to another lamp unit in the system with an appropriate 'beta' factor for the difference in its physical location, thereby allowing a backup for critical lighting situations in a production.

While the invention has been described in detail and with reference to a specific embodiment thereof, it will be apparent to one skilled in the art that various changes and modifications can be made therein without departing from the spirit and scope of the invention.

I claim:

1. In a stage or theatre lighting system having a plurality of multiple parameter lamp units each comprising means for producing a light beam having a plurality of adjustable parameters relating to beam characteristics and beam position; drive means for controlling a plurality of said parameters; lamp processor means for controlling said drive means; and lamp memory means for storing data and programs for execution by said lamp processor means; the improvement comprising said lamp memory means having non-volatile memory means for storage of all of said operating program and volatile memory means for storage of all lamp cue data; internal clock means; and command means to operably command said operating program to execute said stored cue data in a desired, pre-programmed time and sequence using said internal clock means.

2. A lighting system as claimed in claim 1 wherein said command means comprises a central processor means in communication by a data link system with each of said lamp units to commence said execution.

3. A lighting system as claimed in claim 2 wherein said central processor means is a desk top PC.

4. A lighting system as claimed in claim 2 wherein said central processor means comprises means for receiving parameter-controlling inputs for directing the operation of said lighting system to comprise said lamp cue data, and means for downloading said data to said volatile memory means of each respective lamp unit.

5. A lighting system as claimed in claim 4 wherein said data link system comprises a common path for connecting said central processor means to each of said lamp units.

6. A method of controlling a stage or theatre lighting system having a plurality of multiple parameter lamp units each having an associated processor having non-volatile memory means, volatile memory means and internal clock means, said method comprising the steps of (a) storing executable operating programs in each of said non-volatile memory means of said lamp units;
(b) storing all appropriate lamp due data in each of said volatile memory means of said lamps; and
(c) initiating each of said lamp units to command said operating program to execute said stored cue data in pre-programmed time and sequence using said internal clock means.

* * * * *